United States Patent
Kwak et al.

(10) Patent No.: US 8,560,003 B2
(45) Date of Patent: Oct. 15, 2013

(54) MOBILE COMMUNICATION DEVICE

(75) Inventors: Ho-Yoon Kwak, Suwon-si (KR); Hong-Bae Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 964 days.

(21) Appl. No.: 12/204,251

(22) Filed: Sep. 4, 2008

(65) Prior Publication Data

US 2009/0186650 A1   Jul. 23, 2009

(30) Foreign Application Priority Data

Jan. 17, 2008  (KR) .................. 10-2008-0005201

(51) Int. Cl.
*H04M 1/00* (2006.01)

(52) U.S. Cl.
USPC .............. 455/550.1; 455/575.1; 455/575.3; 455/575.4; 361/679.39

(58) Field of Classification Search
USPC ............. 455/575.1, 575.3, 575.4, 550.1; 379/428.01; 361/679.13–679.16, 361/679.55, 679.56, 679.32, 679.35, 361/679.39, 755
See application file for complete search history.

(56) References Cited

U.S. PATENT DOCUMENTS

| | | | | |
|---|---|---|---|---|
| 5,502,460 | A * | 3/1996 | Bowen ..................... | 345/168 |
| 5,644,338 | A * | 7/1997 | Bowen ..................... | 345/168 |
| 6,580,932 | B1 * | 6/2003 | Finke-Anlauff ......... | 455/566 |
| 6,748,242 | B1 * | 6/2004 | Dunleavy ................ | 455/566 |
| 6,801,796 | B2 * | 10/2004 | Finke-Anlauff ......... | 455/575.3 |
| D504,888 | S * | 5/2005 | Majanen .................. | D14/247 |
| 6,983,175 | B2 * | 1/2006 | Kwon ...................... | 455/575.1 |
| 7,099,708 | B2 * | 8/2006 | Ronkko ................... | 455/575.1 |
| 7,221,560 | B2 * | 5/2007 | Varela ..................... | 361/679.08 |
| 7,342,776 | B1 * | 3/2008 | Chan ....................... | 361/679.27 |
| D582,367 | S * | 12/2008 | Kim et al. ............... | D14/138 AB |
| D583,810 | S * | 12/2008 | Chen ....................... | D14/345 |
| 7,539,526 | B2 * | 5/2009 | Pirila et al. ............. | 455/575.3 |
| 7,697,270 | B2 * | 4/2010 | Chen ....................... | 361/679.05 |
| 7,881,055 | B2 * | 2/2011 | Brandenberg et al. .. | 361/679.3 |
| 7,884,803 | B2 * | 2/2011 | Huang ..................... | 345/169 |
| 7,889,483 | B2 * | 2/2011 | Sip et al. ................. | 361/679.11 |
| 2002/0006815 | A1 * | 1/2002 | Finke-Anlauff ......... | 455/575 |
| 2002/0066651 | A1 * | 6/2002 | Furuki et al. ........... | 200/5 A |
| 2003/0073414 | A1 * | 4/2003 | Capps ..................... | 455/90 |
| 2003/0147205 | A1 * | 8/2003 | Murphy ................... | 361/680 |
| 2004/0185922 | A1 * | 9/2004 | Sutton et al. ............ | 455/575.1 |
| 2004/0203533 | A1 * | 10/2004 | Yu et al. .................. | 455/90.3 |
| 2005/0054393 | A1 * | 3/2005 | Fagerstrom et al. .... | 455/575.1 |
| 2005/0057891 | A1 * | 3/2005 | Madsen et al. ......... | 361/680 |
| 2005/0105256 | A1 * | 5/2005 | Chuang ................... | 361/680 |
| 2005/0113154 | A1 * | 5/2005 | Park et al. ............... | 455/575.4 |
| 2005/0153728 | A1 * | 7/2005 | Ronkko ................... | 455/550.1 |

(Continued)

*Primary Examiner* — Kamran Afshar
*Assistant Examiner* — Mong-Thuy Tran
(74) *Attorney, Agent, or Firm* — H.C. Park & Associates, PLC (57) ABSTRACT

A mobile communication device includes a body, a first QWERTY key unit having a plurality of QWERTY keys to input alphabets, numbers, and symbols, and a second QWERTY key unit having a plurality of the QWERTY keys to input alphabets, numbers, and symbols. The first QWERTY key unit is fitted on a first end of the body to be pivotally folded backward and forward with respect to the body. The second QWERTY key unit is fitted on a second end of the body to be pivotally folded backward and forward with respect to the body.

18 Claims, 7 Drawing Sheets

(56) References Cited

U.S. PATENT DOCUMENTS

| | | | |
|---|---|---|---|
| 2005/0250561 A1* | 11/2005 | Lee et al. | 455/575.3 |
| 2006/0002072 A1* | 1/2006 | Sutton et al. | 361/683 |
| 2006/0056141 A1* | 3/2006 | Pihlaja et al. | 361/683 |
| 2006/0227500 A1* | 10/2006 | Brandenberg et al. | 361/683 |
| 2006/0270445 A1* | 11/2006 | Miramontes | 455/550.1 |
| 2007/0004477 A1* | 1/2007 | Kim | 455/575.4 |
| 2007/0037618 A1* | 2/2007 | Lee | 455/575.4 |
| 2007/0053145 A1* | 3/2007 | Finke-Anlauff et al. | 361/681 |
| 2007/0123295 A1* | 5/2007 | Kim et al. | 455/550.1 |
| 2007/0161398 A1* | 7/2007 | Chiu et al. | 455/550.1 |
| 2009/0215495 A1* | 8/2009 | Fahlgren et al. | 455/566 |

* cited by examiner

MOBILE COMMUNICATION DEVICE

CROSS REFERENCE TO RELATED APPLICATION

This application claims priority from and the benefit of Korean Patent Application No. 10-2008-0005201, filed on Jan. 17, 2008, which is hereby incorporated by reference for all purposes as if fully set forth herein.

BACKGROUND OF THE INVENTION

1. Field of the Invention

The present invention relates to a mobile communication device, and more particularly, to a mobile communication device having a plurality of foldable or sliding QWERTY key units on both ends of a body thereof.

2. Discussion of the Background

In general, a mobile communication device includes a portable communication unit that provides users with wireless communication service while communicating with a base station and other networked units, and that may include portable multimedia player (PMP) functions.

Mobile communication devices are popularly used worldwide, and have become necessities for daily life regardless of the user's age and gender.

Some mobile communication devices are equipped with a small QWERTY keyboard, to enable the users to input characters and numbers more conveniently.

A QWERTY keyboard (hereinafter referred to as "QWERTY key unit") is generally configured with a character mode to input characters and a numeric mode to input numbers.

However, a QWERTY keyboard is normally installed on one side of the main device and the sizes of the QWERTY keys are generally small because of the limited space. Therefore, it may be inconvenient for people with big fingers to use the small QWERTY keys.

Furthermore, there are many restrictions in designing the mobile communication device because of structural difficulties due to the limited space.

SUMMARY OF THE INVENTION

The present invention provides a mobile communication device having QWERTY key units on both ends of a body thereof, each QWERTY key unit having a plurality of keys that can be selectively folded or slid into a lower portion of the body, so that the mobile communication device may have an improved design and be used conveniently by people with big fingers.

Additional features of the invention will be set forth in the description which follows, and in part will be apparent from the description, or may be learned by practice of the invention.

The present invention discloses a mobile communication device including a body, a first QWERTY key unit, and a second QWERTY key unit. The first QWERTY key unit has a plurality of QWERTY keys to input alphabets, numbers, and symbols, and is fitted on a first end of the body to be rotatable about a first axis perpendicular to the body. The second QWERTY key unit has a plurality of the QWERTY keys to input alphabets, numbers, and symbols, and is fitted on a second end of the body to be rotatable about a second axis perpendicular to the body.

The present invention also discloses a mobile communication device including a body, a housing located below the body and having a first opening and a second opening on opposite ends thereof, a first QWERTY key unit to input alphabets, numbers, and symbols, and capable of sliding into and out of the housing through the first opening, and a second QWERTY key unit to input alphabets, numbers, and symbols, and capable of sliding into and out of the housing through the second opening.

The present invention also discloses a mobile communication device including a body, a first QWERTY key unit, and a second QWERTY key unit. The first QWERTY unit has a plurality of QWERTY keys to input alphabets, numbers, and symbols, and is fitted on a first end of the body to be pivotally folded upward and downward with respect to the body. The second QWERTY key unit has a plurality of the QWERTY key to input alphabets, numbers, and symbols, and is fitted on a second end of the body to be pivotally folded upward and downward with respect to the body.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 1:
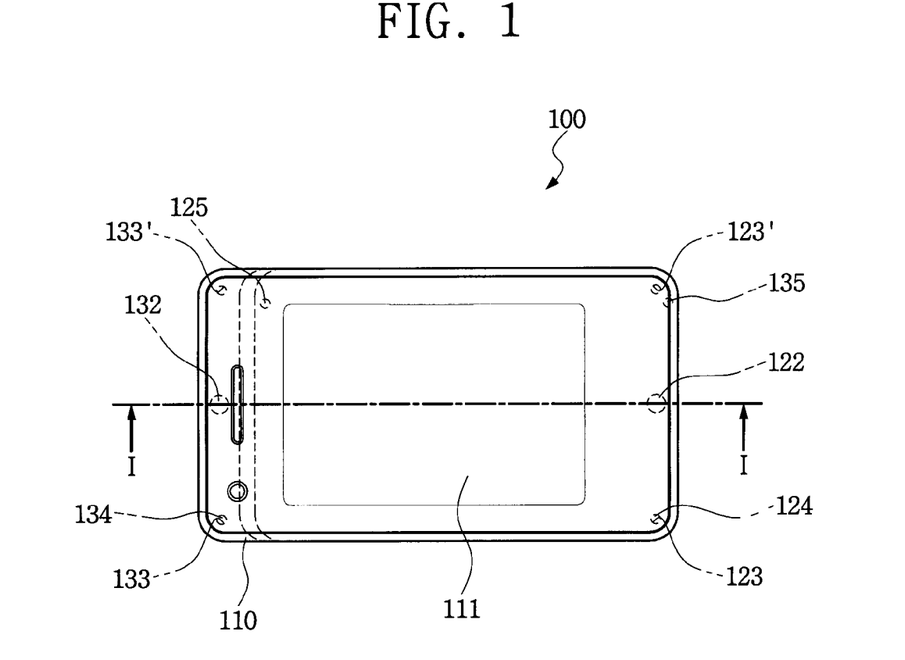
FIG. 1 is a perspective view of a mobile communication device in accordance with a first exemplary embodiment of the invention, wherein QWERTY key units are folded in a nested configuration.
Figure 2:
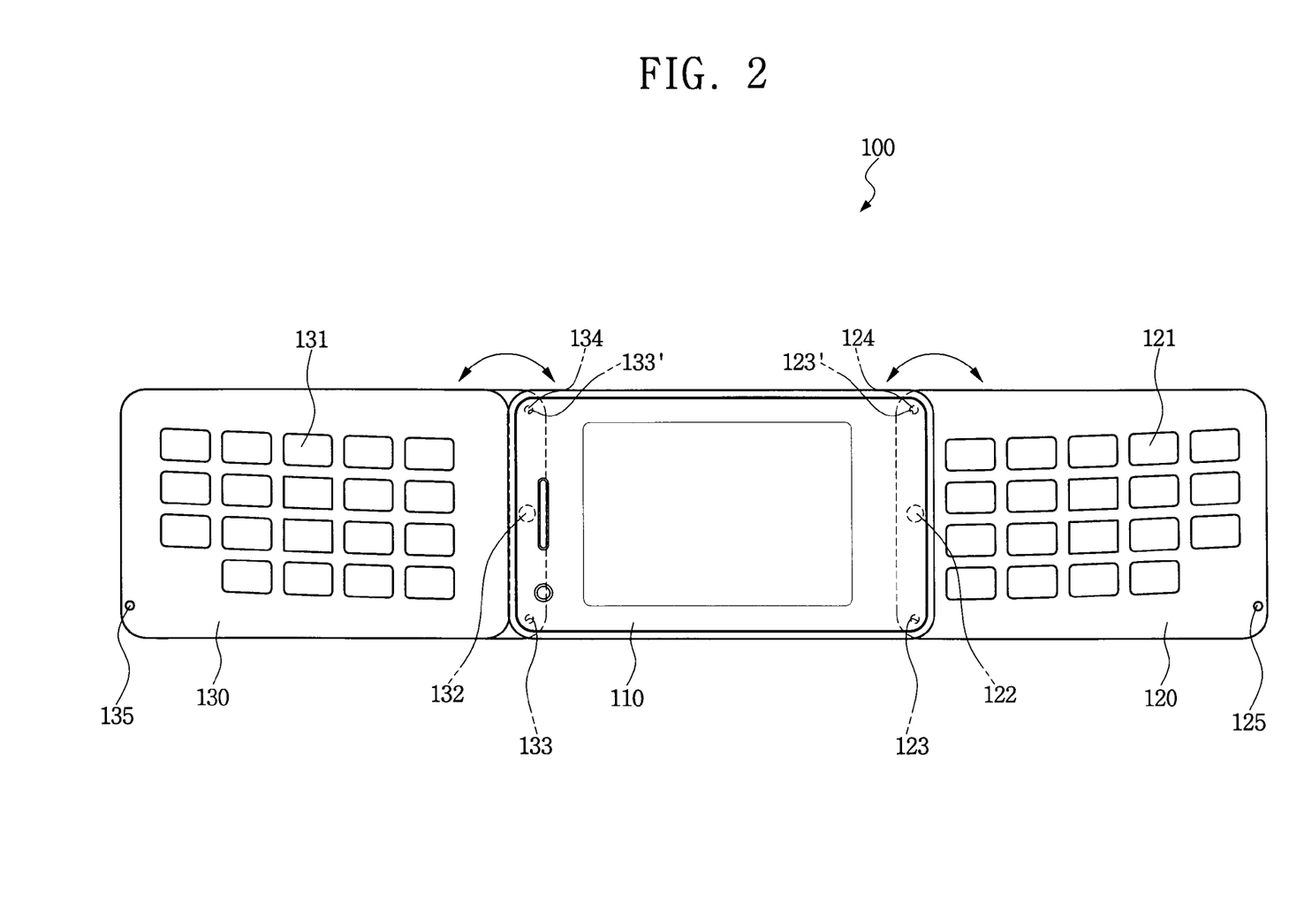
FIG. 2 is a perspective view showing the unfolded state of the first QWERTY key unit and the second QWERTY key units of FIG. 1.
Figure 3:
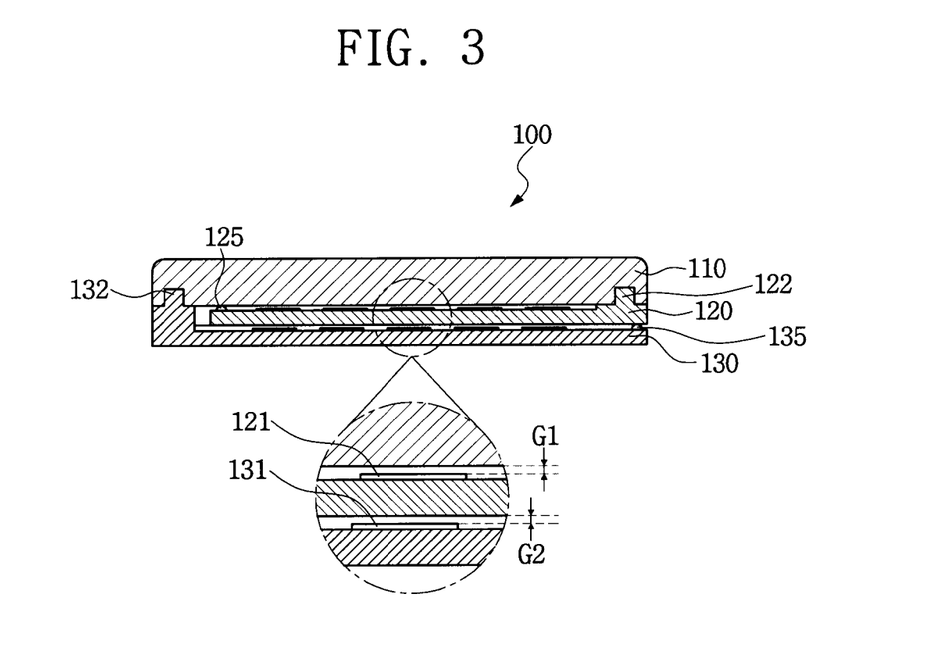
FIG. 3 is a cross section taken along I-I line of FIG. 1.

FIG. 1 is a perspective view of a mobile communication device in accordance with a first exemplary embodiment of the invention, wherein QWERTY key units are folded in a nested configuration, FIG. 2 is a perspective view showing the closed state of the first QWERTY key unit and the second QWERTY key units of FIG. 1, and FIG. 3 is a cross section taken along I-I line of FIG. 1.

Referring to FIG. 1, FIG. 2, and FIG. 3, the mobile communication device 100 in accordance with the first exemplary embodiment of the invention includes a body 110, which has circuit components (not shown) and a touch screen 111. A first QWERTY key unit 120, having a plurality of QWERTY keys 121 to input alphabets, numbers, and symbols, is fitted on one end of the body 110 and is designed to be rotated about an axis perpendicular to the body 110. A second QWERTY key unit 130, having a plurality of QWERTY keys 131 to input alphabets, numbers and symbols, is fitted on an opposite end of the body 110, and is designed to be rotated about an axis perpendicular to the body 110.

The first QWERTY key unit 120 is connected to one end of the body 110 by a first hinge 122, and the second QWERTY key unit 130 is connected to an opposite end of the body 110 by a second hinge 132.

The first QWERTY key unit 120 is located just below the body 110 and the second QWERTY key unit 130 is located just below the first QWERTY key unit 120 when the first QWERTY key unit 120 and the second QWERTY key unit 130 are rotated.

A gap G1 may be maintained between the body 110 and the first QWERTY key unit 120, and a gap G2 may be maintained between the first QWERTY key unit 120 and the second QWERTY key unit 130.

The gaps G1 and G2 prevent the QWERTY keys 121 and 131 from interfering with each other when the first QWERTY key unit 120 and the second QWERTY key unit 130 rotated toward or away from the body 110.

The first QWERTY key unit 120 and the second QWERTY key unit 130 should not move freely after the first QWERTY key unit 120 and the second QWERTY key unit 130 are rotated into the extended position.

For this reason, a move-prevention tongue 124 is formed on the first QWERTY key unit 120, and mating move-prevention grooves 123 and 123' are formed in the body 110.

In a similar way, a move-prevention tongue 134 is formed on the second QWERTY key unit 130, and mating move-prevention grooves 133 and 133' are formed in the body 110.

A first gap-support tongue 125 and a second gap-support tongue 135 may be formed at the top edge of the first QWERTY key unit 120 and the top edge of the second QWERTY key unit 130.

Figure 4:
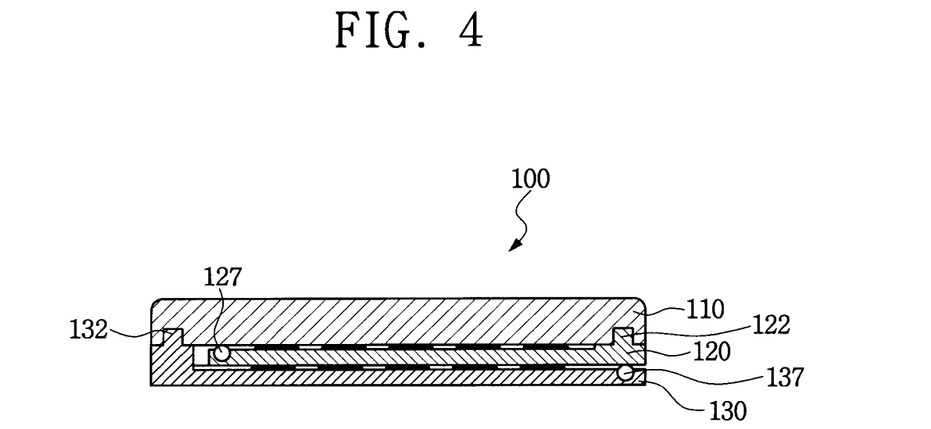
FIG. 4 is a vertical sectional view of the mobile communication device in accordance with the first exemplary embodiment of the invention, which has modified gap-support tongues for the body, the first QWERTY key unit, and the second QWERTY key unit.

FIG. 4 is a vertical sectional view of the mobile communication device in accordance with the first exemplary embodiment of the invention, which has modified gap-support tongues for the body, the first QWERTY key unit, and the second QWERTY key unit.

Referring to FIG. 4, the first gap-support ball 127 and the second gap-support ball 137 may be respectively installed on the tope edge of the first QWERTY key unit 120 and the top edge of the second QWERTY key unit 130.

The first gap-support ball 127 is rotationally coupled to the top edge of the first QWERTY key unit 120, and the second gap-support ball 137 is rotationally coupled to the top edge of the second QWERTY key unit 130.

Since the first gap-support ball 127 and the second gap-support ball 137 are rotational, the first QWERTY key unit 120 and the second QWERTY key unit 130 may smoothly come together when the users rotate the first QWERTY key unit 120 and the second QWERTY key unit 130 toward the body 110.

Referring to the above-mentioned figures, the operation of the mobile communication device in accordance with the first exemplary embodiment will be described as follows.

If the user wants to use the QWERTY key units 120 and 130 when the first QWERTY key unit 120 and the second QWERTY key unit 130 are in the closed position as shown in FIG. 1, the user may rotate the first QWERTY key unit 120 and the second QWERTY key unit 130 on the first hinge 122 and the second hinge 132, respectively, to reach the opened position.

When the first QWERTY key unit 120 and the second QWERTY key unit 130 are fully rotated to reach the opened position, the move-prevention tongue 124 is inserted into the move-prevention groove 123' and the move-prevention tongue 134 is inserted into the move-prevention groove 133'. As a result, the first QWERTY key unit 120 and the second QWERTY key unit 130 may maintain the open state without any free movement. If the QWERTY key units 120 and 130 are not being used, the user can pivotally rotate the first QWERTY key unit 120 and the second QWERTY key unit 130 back on the first hinge 122 and the second hinge 132, respectively.

When the first QWERTY key unit 120 and the second QWERTY key unit 130 are fully rotated back to reach the closed position, the move-prevention tongue 124 is inserted into the move-prevention groove 123 and the move-prevention tongue 134 is inserted into the move-prevention groove 133. As a result, the first QWERTY key unit 120 and the second QWERTY key unit 130 may maintain the closed state without any free movement.

Referring to the mobile communication device 100 with the above-mentioned figures in accordance with the first exemplary embodiment, the first QWERTY key unit 120 and the second QWERTY key unit 130 are rotationally installed and symmetrically arranged on opposite ends of the body 110. Therefore, not only can the user securely use the QWERTY keys, but also people with big fingers may conveniently use the QWERTY keys since it is possible to have larger QWERTY keys.

Figure 5:
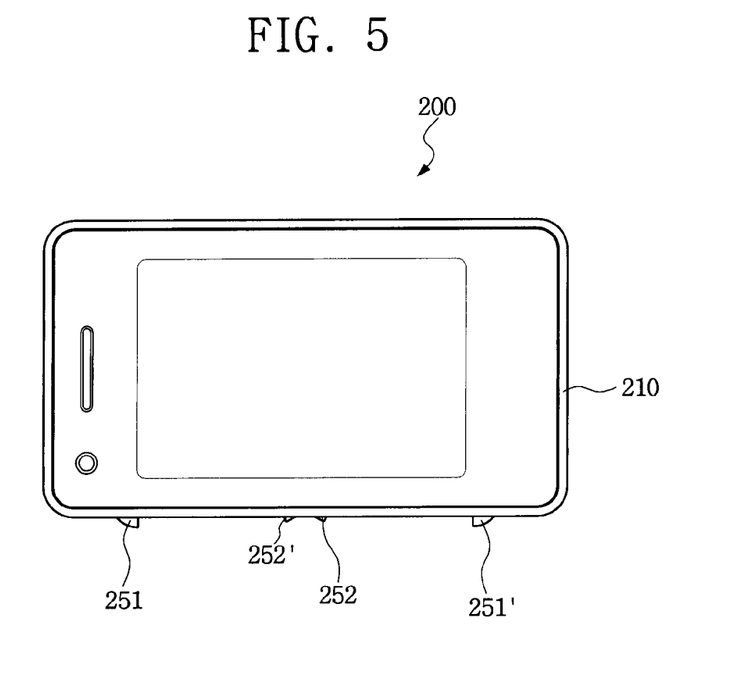
FIG. 5 is a perspective view of a mobile communication device in accordance with a second exemplary embodiment of the invention.
Figure 6:
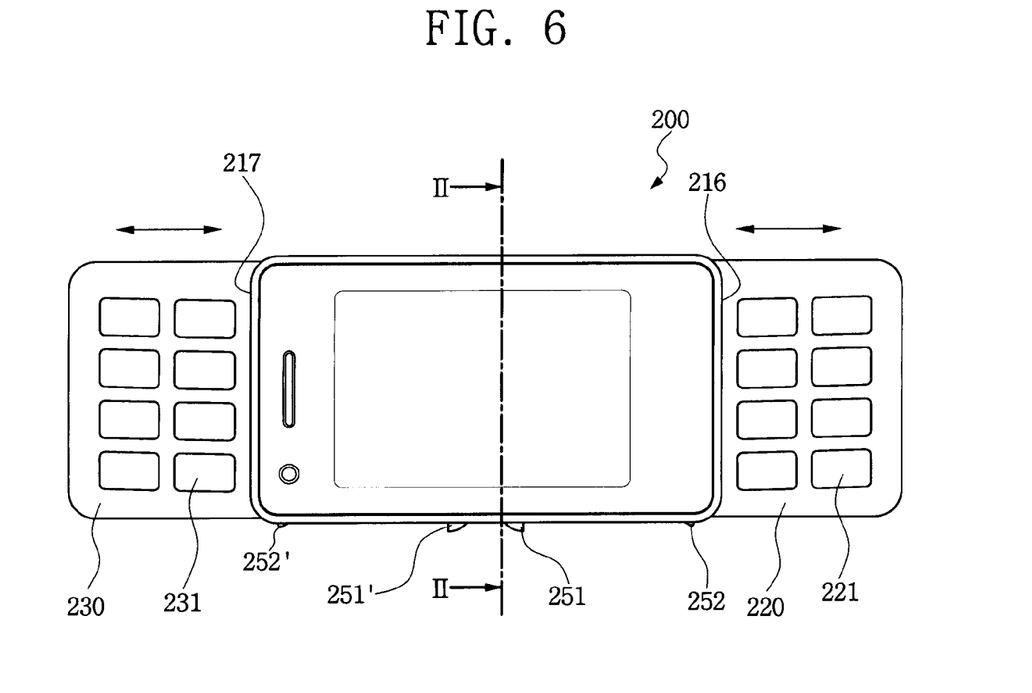
FIG. 6 is a perspective view showing the unfolded state of the first QWERTY key unit and the second QWERTY key unit of FIG. 5.
Figure 7:
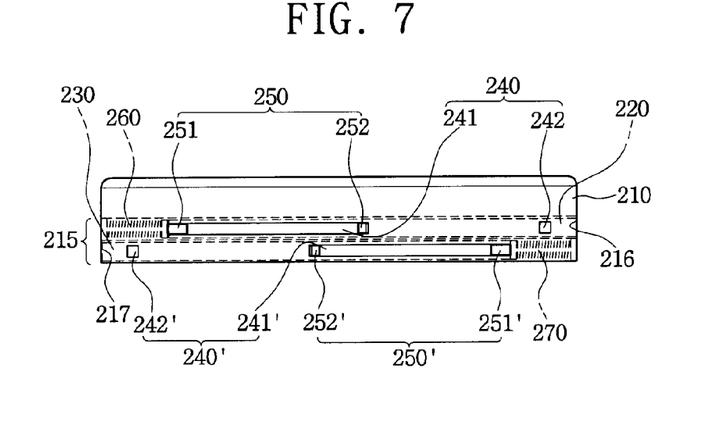
FIG. 7 and FIG. 8 are side views of FIG. 5.
Figure 8:
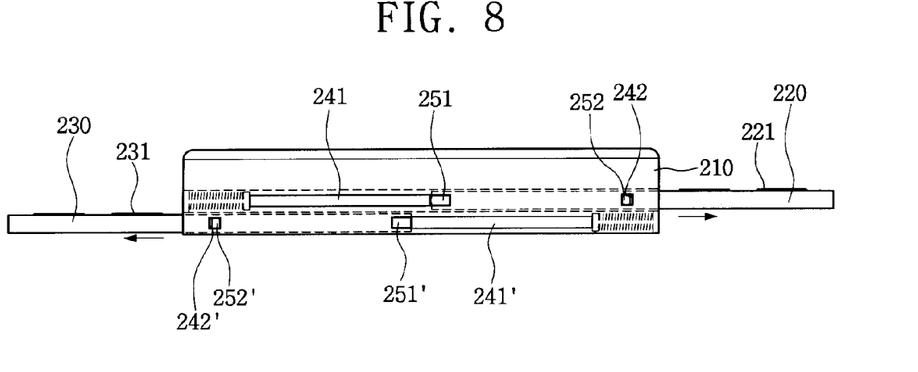
Figure 9:
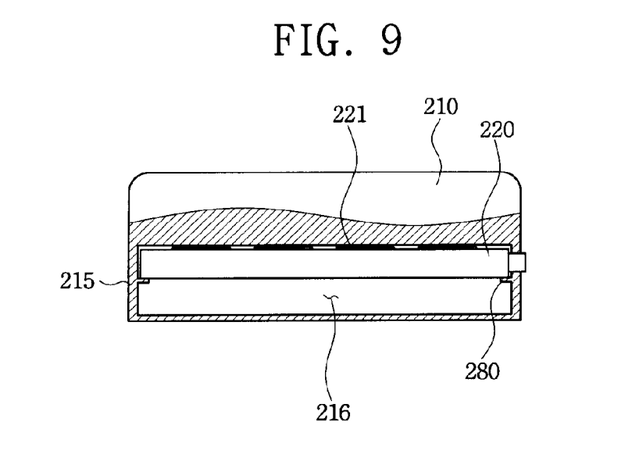
FIG. 9 is a cross section taken along II-II line of FIG. 5.

FIG. 5 is a perspective view of a mobile communication device in accordance with a second exemplary embodiment of the invention, FIG. 6 is a perspective view showing the unfolded state of the first QWERTY key unit and the second QWERTY key unit of FIG. 5, FIG. 7 to FIG. 8 are side views of FIG. 5, and FIG. 9 is a cross section taken along II-II line of FIG. 5.

Referring to FIG. 5, FIG. 6, FIG. 7, FIG. 8, and FIG. 9, the mobile communication device 200 in accordance with the second exemplary embodiment of the mobile communication device 200 includes a body 210 and a housing 215 located below the body 210 with openings 216 and 217 on opposite ends thereof.

A first QWERTY key unit 220, having multiple QWERTY keys 221 to input alphabets, numbers, and symbols, is installed on one end of the body 210, and can slide into and out of the housing 215 through the opening 216 of the housing 215.

A second QWERTY key unit 230, having multiple QWERTY keys 231 to input alphabets, numbers, and symbols, is installed on an opposite end of the body 110, and may slide into and out of the housing 215 through the opening 217 of the housing 215.

Guide rails 280 are installed in the middle of the housing 215 to guide the sliding movement of the first QWERTY key unit 220 and the second QWERTY key unit 230.

Locking grooves 240 are formed in the housing 215 to keep the first QWERTY key unit 220 either in the housing 215 or out of the housing 215, and locking tongues 250 corresponding to the locking groove 240 are formed on the first QWERTY key unit 220.

A first spring 260 is connected to an inner end of the first QWERTY key unit 220.

The locking grooves 240 include a first locking groove 241 and a second locking groove 242, and the locking tongues 250 include a first locking tongue 251 and a second locking tongue 252.

Locking grooves 240' are formed in the housing 215 to keep the second QWERTY key unit 230 either in the housing 215 or out of the housing 215, and locking tongues 250' corresponding to the locking groove 240' are formed on the second QWERTY key unit 230.

A second spring 270 is connected to the inner end of the second QWERTY key unit 230.

The locking grooves 240' include a first locking groove 241' and a second locking groove 242', and the locking tongues 250' include a first locking tongue 251' and a second locking tongue 252'.

The operation of the mobile communication device in accordance with the second exemplary embodiment having the above-mentioned figures will be described as follows.

As shown in FIG. 7 and FIG. 8, the first QWERTY key unit 220 and the second QWERTY key unit 230 are stored inside the housing 215. In this situation, the second locking tongue 252 maintains a locked state with the first locking groove 241 due to the first spring 260.

When the user wants to use the QWERTY keys in this locked condition, the user can push down the second locking tongue 252, and the second locking tongue 252 will be released from the first locking groove 241. Then, the first QWERTY key unit 220 can slide out of the housing 215 through the opening 216 due to the elasticity of the first spring 260. Then the first locking tongue 251 will be locked with the first locking groove 241, the second locking tongue 252 will be locked with the second locking groove 242, and the first QWERTY key unit 220 is extracted from the body of the mobile communication device.

In the same manner, when the user pushes down the second locking tongue 252', the second locking tongue 252' will be released from the first locking groove 241'. Then the second QWERTY key unit 230 can slide out of the housing 215 due to the elasticity of the second spring 270. Then the first locking tongue 251' will be locked with the first locking groove 241', the second locking tongue 252' will be locked with the second locking groove 242', and the second QWERTY key unit 230 is extracted from the body of the mobile communication device.

Conversely, if the QWERTY key units are not used, the user can push back the first QWERTY key unit 220 to slide back into the housing 215. Then the second locking tongue 252 maintains the locked state with the first locking groove 241 due to the elasticity of the first spring 260.

The user can push the second QWERTY key unit 230 back into the housing 215. Then the second locking tongue 252' maintains the locked state with the first locking groove 241' due to the elasticity of the second spring 270. With these movements, the first QWERTY key unit 220 and the second QWERTY key unit 230 may be folded into the closed position.

Figure 10:
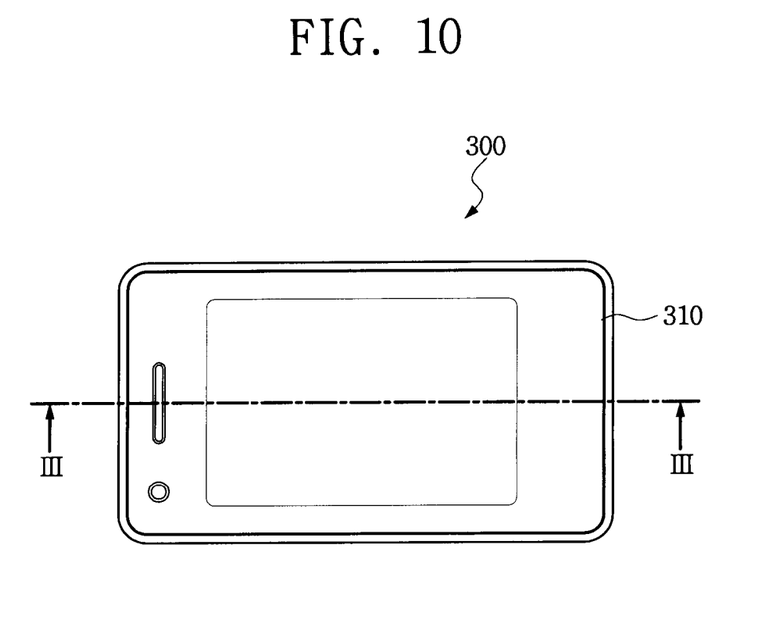
FIG. 10 is a perspective view of a mobile communication device in accordance with a third exemplary embodiment of the invention.
Figure 11:
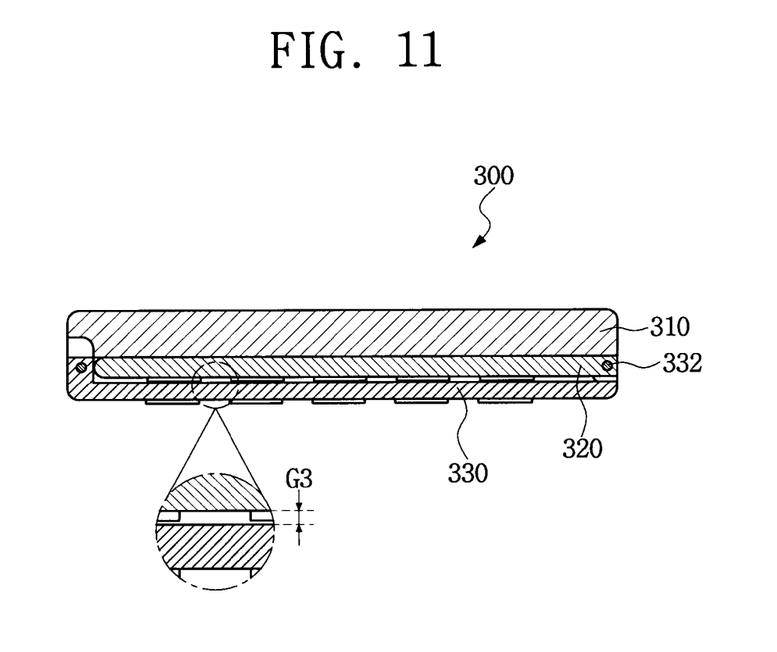
FIG. 11 is a cross section taken along III-III line of FIG. 10.
Figure 12:
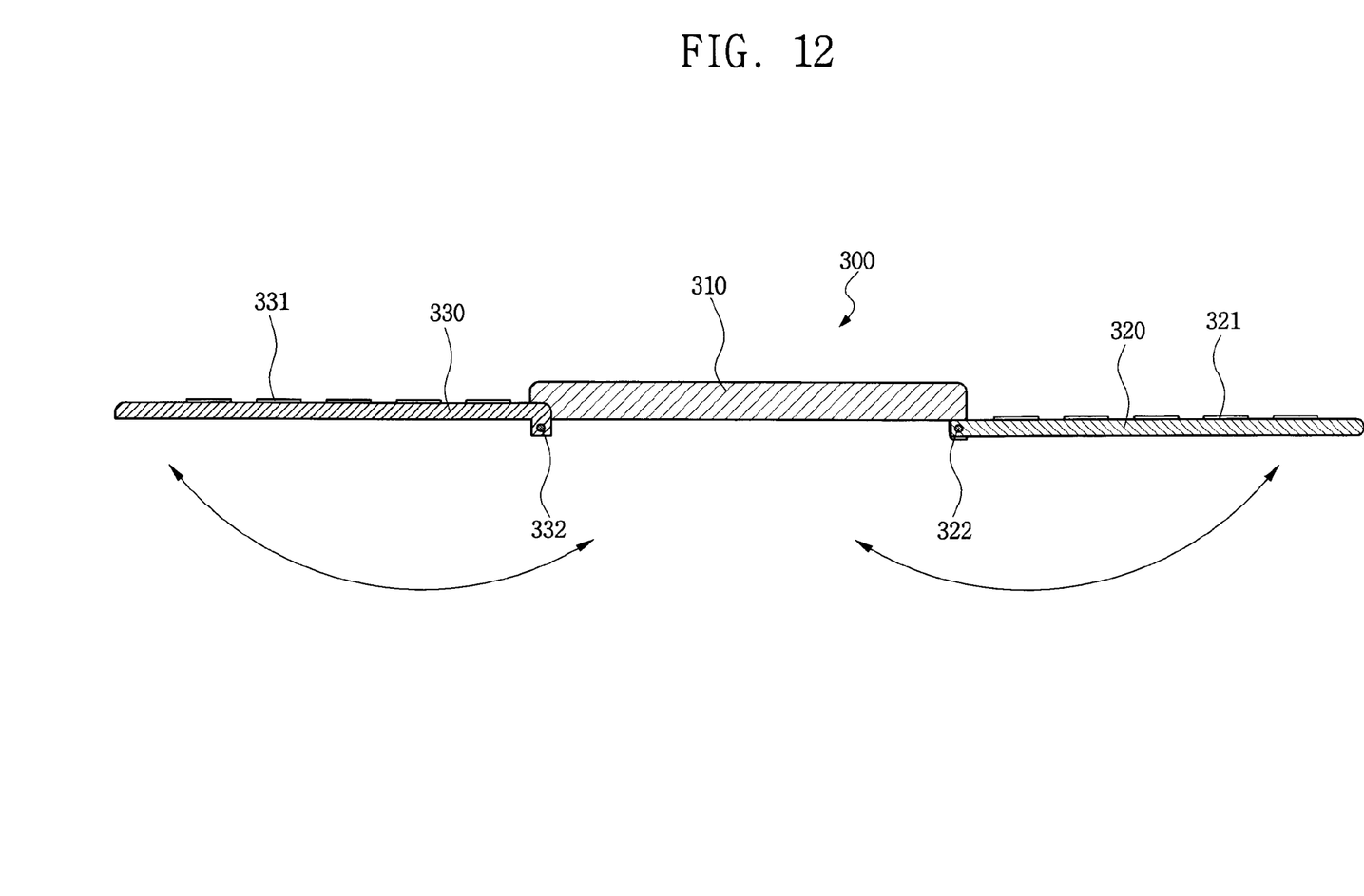
FIG. 12 is a perspective view showing the unfolded state of the first QWERTY key unit and the second QWERTY key unit of FIG. 10.

FIG. 10 is a perspective view of a mobile communication device in accordance with a third exemplary embodiment of the invention, FIG. 11 is a cross section taken along III-III line of FIG. 10, and FIG. 12 is a perspective view showing the unfolded state of the first QWERTY key unit and the second QWERTY key unit of FIG. 10.

Referring to FIG. 10, FIG. 11, and FIG. 12, the mobile communication device 300 in accordance with the third exemplary embodiment of the mobile communication device includes a body 310 having circuit components and a touch screen.

A first QWERTY key unit 320, having a plurality of the QWERTY keys 321 to input alphabets, numbers, and symbols, is fitted on one side of the body 310, and is designed to be pivotally folded upward and downward with respect to the body 310.

A second QWERTY key unit 330, having a plurality of the QWERTY key 331 to input alphabets, numbers, and symbols, is fitted on the other side of the body 310, and is designed to be pivotally folded upward and downward with respect to the body 310.

The first QWERTY key unit 320 is connected to one side of the body 310 by a first hinge 322, and the second QWERTY key unit 330 is connected to the other side of the body 310 by a second hinge 332.

When the first QWERTY key unit 320 and the second QWERTY key unit 330 are folded into the closed position, the first QWERTY key unit 320 is located just below the body 310 and the second QWERTY key unit 330 is located just below the first QWERTY key unit 320.

A gap (not shown) may be maintained between the bottom of the body 310 and the top of the first QWERTY key unit 320, and a gap G3 may be maintained between one side of the first QWERTY key unit 320 and one side of the second QWERTY key unit 330.

These gaps prevent the QWERTY keys 321 from interfering with each other when the first QWERTY key unit 320 and the second QWERTY key unit 330 move backward and forward with respect to the body 310.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A mobile communication device, comprising:
 a body comprising a front panel where a display is provided;
 a first QWERTY key unit having a plurality of QWERTY keys, the first QWERTY key unit body configured to be rotatable to transit from/to an open state to/from a closed state about a first axis perpendicular to the front panel; and
 a second QWERTY key unit having a plurality of the QWERTY keys, the second QWERTY key unit config- ured to be rotatable to transit from/to the open state to/from the closed state about a second axis perpendicular to the front panel, wherein the first QWERTY key unit is connected to the body using a first hinge formed by a first side edge of the body, and the second QWERTY key unit is connected to the body using a second hinge formed by a second side edge of the body opposite the first side edge, wherein the first QWERTY key unit is configured to be rotated about the first axis from/to the open state, in which a side of the first QWERTY key unit is positioned along the first side edge of the body, to/from the closed state, in which the side of the first QWERTY key unit is positioned along the first side edge and in a direction opposite to that of the open state, and wherein the second QWERTY key unit is configured to be rotated about the second axis from/to the open state, in which a side of the second QWERTY key unit is positioned along the second side edge of the body, to/from the closed state, in which the side of the second QWERTY key unit is positioned along the second side edge and in a direction opposite to that of the open state.

2. The mobile communication device of claim 1, wherein the first QWERTY key unit is located below the body, and the second QWERTY key unit is located below the first QWERTY key unit when the mobile communication device is in the closed state.

3. The mobile communication device of claim 1, wherein the body, the first QWERTY key unit, and the second QWERTY key unit are spaced apart from each other when the mobile communication device is in the closed state.

4. The mobile communication device of claim 1,
wherein a first move-prevention groove and a first move-prevention tongue are disposed on a first end of the body and a mating side of the first QWERTY key unit respectively, so that the first QWERTY key unit and the second QWERTY key unit do not move freely when they are unfolded to an extended position, and wherein a second move-prevention groove and a second move-prevention tongue are disposed on a second end of the body and a mating side of the second QWERTY key unit, respectively.

5. The mobile communication device of claim 1, wherein a first gap-support tongue and a second gap-support tongue are disposed on a top edge of the first QWERTY key unit and a top edge of the second QWERTY key unit, respectively.

6. The mobile communication device of claim 1, wherein a first gap-support groove and a second gap-support groove are disposed in a top edge of the first QWERTY key unit and in a top edge of the second QWERTY key unit, respectively.

7. The mobile communication device of claim 1, wherein a first gap-support ball and a second gap-support ball are rotationally coupled to a top edge of the first QWERTY key unit and a top edge of the second QWERTY key unit, respectively.

8. The mobile communication device of claim 1, wherein the sides of the first and second QWERTY key units are aligned with the first and second side edges of the body, respectively, both in the open state and the closed state.

9. The mobile communication device of claim 1, wherein the side of the first QWERTY key unit is aligned with the first side edge of the body in the open state, and, when the key unit is rotated around the first axis perpendicular to the front panel to transit from the open state to the closed state, the side of the first QWERTY key unit is aligned with the first side edge of the body.

10. A mobile communication device, comprising:
a body;
a housing located below the body and having a first opening on a first side and a second opening on a second side opposite the first side;
a first QWERTY key unit, and capable of sliding into and out of the housing through the first opening;
a second QWERTY key unit, and capable of sliding into and out of the housing through the second opening,
a first spring connected to an end of the first QWERTY key unit and connected to a first inside portion of the housing, the first inside portion facing the first opening; and
a second spring connected to an end of the second QWERTY key unit and connected to a second inside portion of the housing, the second inside portion facing the second opening opposite the first opening;
a first locking groove disposed in the housing to keep the first QWERTY key unit in a stored position inside the housing;
a first locking tongue disposed on the first QWERTY key unit to correspond to the first locking groove when the first QWERTY key unit is in the stored position inside the housing;
a second locking groove disposed in the housing; and
a second locking tongue disposed on the first QWERTY key unit, wherein the second locking tongue corresponds to the first locking groove and the first locking tongue corresponds to the second locking groove when the first QWERTY key unit is outside the housing.

11. The mobile communication device of claim 10, wherein a third locking groove is disposed in the housing to keep the second QWERTY key unit in a stored position inside the housing, and
a third locking tongue is disposed on the second QWERTY key unit to correspond to the third locking groove when the second QWERTY key unit is in a stored position inside the housing.

12. The mobile communication device of claim 11, wherein a fourth locking groove is disposed in the housing and a fourth locking tongue is disposed on the second QWERTY key unit, and
wherein the fourth locking tongue corresponds to the third locking groove and the third locking tongue corresponds to the fourth locking groove when the second QWERTY key unit is outside the housing.

13. The mobile communication device of claim 10, wherein guide rails are installed in the middle of the housing to guide the sliding movement of the first QWERTY key unit and the second QWERTY key unit.

14. A mobile communication device, comprising:
a body comprising a front panel where a display is provided and a back panel opposite the front panel;
a first QWERTY key unit having a plurality of QWERTY keys formed on a first plate, the first QWERTY key unit fitted on a first end of the body to be pivotally folded toward the back panel and unfolded toward the front panel; and
a second QWERTY key unit having a plurality of the QWERTY keys formed on a second plate, the second QWERTY key unit fitted on a second end of the body to be pivotally folded toward the back panel and unfolded toward the front panel,
wherein the second plate comprises a bent end portion connected to the second end of the body to provide a distance between the first plate and the second plate when the first and second QWERTY key units are folded, and wherein the bent end portion of the second plate is maintained in the same shape when the second QWERTY key unit is folded and unfolded.

15. The mobile communication device of claim 14, wherein the first QWERTY key unit is connected to the body by a first hinge, and the second QWERTY key unit is connected to the body by a second hinge.

16. The mobile communication device of claim 14, wherein the first QWERTY key unit is located below the body, and the second QWERTY key unit is located below the first QWERTY key unit when the mobile communication device is in a closed state.

17. The mobile communication device of claim 16, wherein the body is directly on the first QWERTY key unit when the mobile communication device is in a closed state.

18. The mobile communication device of claim 14, wherein the first QWERTY key unit and the second QWERTY key unit are spaced apart from each other when the mobile communication device is in a closed state.

* * * * *